Figure 1:
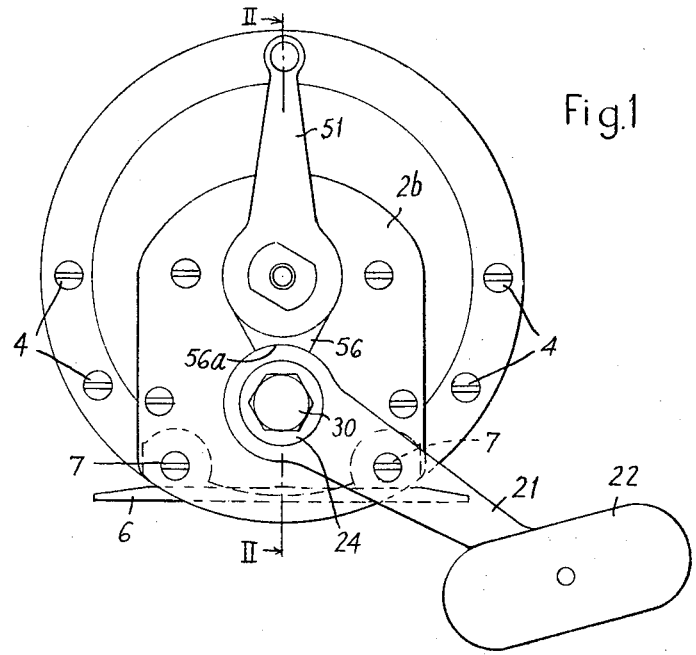

Nov. 8, 1966    H. POLICANSKY    3,284,020
FRICTION CLUTCH MECHANISM FOR A FISHING REEL
Filed May 22, 1964    2 Sheets-Sheet 1

Inventor
*H. Policansky*
By
*Holcombe, Wetherill & Brisbois*
Attorneys

Nov. 8, 1966          H. POLICANSKY          3,284,020
FRICTION CLUTCH MECHANISM FOR A FISHING REEL
Filed May 22, 1964                     2 Sheets-Sheet 2

Inventor
H. Policansky
By
Holcomb, Wetherill & Brisebois
Attorneys

United States Patent Office 3,284,020
Patented Nov. 8, 1966

3,284,020
FRICTION CLUTCH MECHANISM FOR A
FISHING REEL
Hyman Policansky, Valley House, Oak Ave., Kenilworth,
Cape Town, Cape Province, Republic of South Africa
Filed May 22, 1964, Ser. No. 369,453
Claims priority, application Great Britain, May 24, 1963,
20,854/63
11 Claims. (Cl. 242—84.46)

This application is a continuation-in-part of my prior application Serial No. 227,830 filed October 2, 1962, and now abandoned.

The present invention relates to fishing reels and, more particularly, to a fishing reel of the multiplying type which is primarily intended for game fishing and which incorporates a braking arrangement for applying drag to the fishing line when it is being pulled off the reel by a fish.

Specifically, the present invention relates to a fishing reel of the type in which a spool for fishing line is rotatable, through a friction coupling by a winding handle geared to one part of the friction coupling, which part is prevented from rotating in one direction, and in which means are provided for varying the coupling pressure between the two parts of the friction coupling. The winding handle may, thus, be turned to rotate the spool through the friction coupling in order to wind fishing line on to the spool whilst, when line is being pulled off the spool, the part of the friction coupling rotatable with the handle remains stationary and thereby exerts a braking force on the spool through the friction coupling in order to apply drag to the line. The friction coupling may be adapted to be completely disengaged so that the spool can free-wheel, for example, to allow for casting of the fishing line.

A primary object of this invention is to provide a fishing reel of the above type which has normally stationary means, for example a lever, for controlling the coupling pressure, between the two parts of the friction coupling, so that a fisherman can immediately see how much drag is being applied to the fishing line, and in which no stress is put on the reel frame by the friction coupling.

The best of the abovementioned fishing reels on the market today are relatively expensive and one of the reasons for this is the care and attention given to protecting the bearings, on which the spool rotates, against water damage. In such reels the spool is normally supported on a spindle mounted for rotation with the spool in bearings in the side plates of the reel frame and these bearings are always difficult to protect from water damage.

Accordingly, another object of this invention is to provide a fishing reel of the abovementioned type, in which a spindle assembly supporting the spool is normally stationary with respect to the side plates, thereby obviating the necessity of providing rotary bearings for the spindle in the side plates, and in which ball bearings rotatably supporting the spool on the spindle can be easily and simply protected against water damage.

A further object is to provide a fishing reel having a lever-operated brake mechanism and other advantages of the most expensive reels of the aforementioned type, but of much simpler and cheaper construction.

The means for preventing the part of the friction coupling which is rotatable with the winding handle from rotating in one direction may comprise a pawl and ratchet mechanism and in a preferred form of the invention the pawl or ratchet is mounted on a pinion directly connected to said friction coupling part. The advantage of this arrangement is that when the spool rotates and the said coupling part is held stationary, the torque applied to said coupling part by the other coupling part is not transmitted to the pawl and ratchet mechanism by the pinion driving one or more other gears of the gear wheel mechanism. Consequently, the gear teeth of the pinion and the other gear wheel or wheels are not highly stressed and the other gear wheel or wheels may therefore be made from synthetic plastics material, which makes them less expensive to produce and provides for relatively silent operation of the reel. Furthermore, such plastic gears are not subject to corrosion. Also, as a result of the gear teeth not being highly stressed, the pinion and the other gear wheel or wheels do not have to be made so robust as hitherto and a higher gear ratio than that given by known gear mechanisms can be provided in the same space as is occupied by the latter.

Other objects and advantages of the invention will be apparent from the following description, the accompanying drawings and the appended claims.

Figure 2:
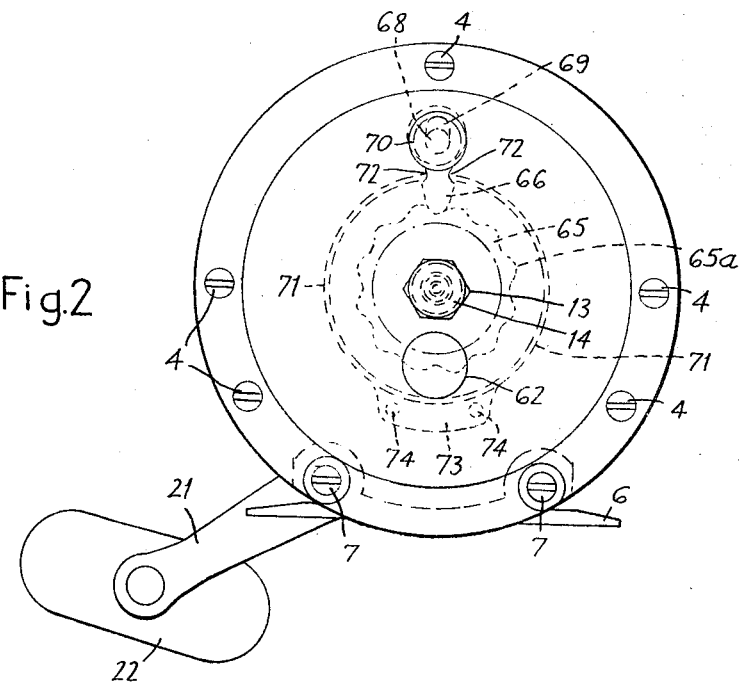
Figure 3:
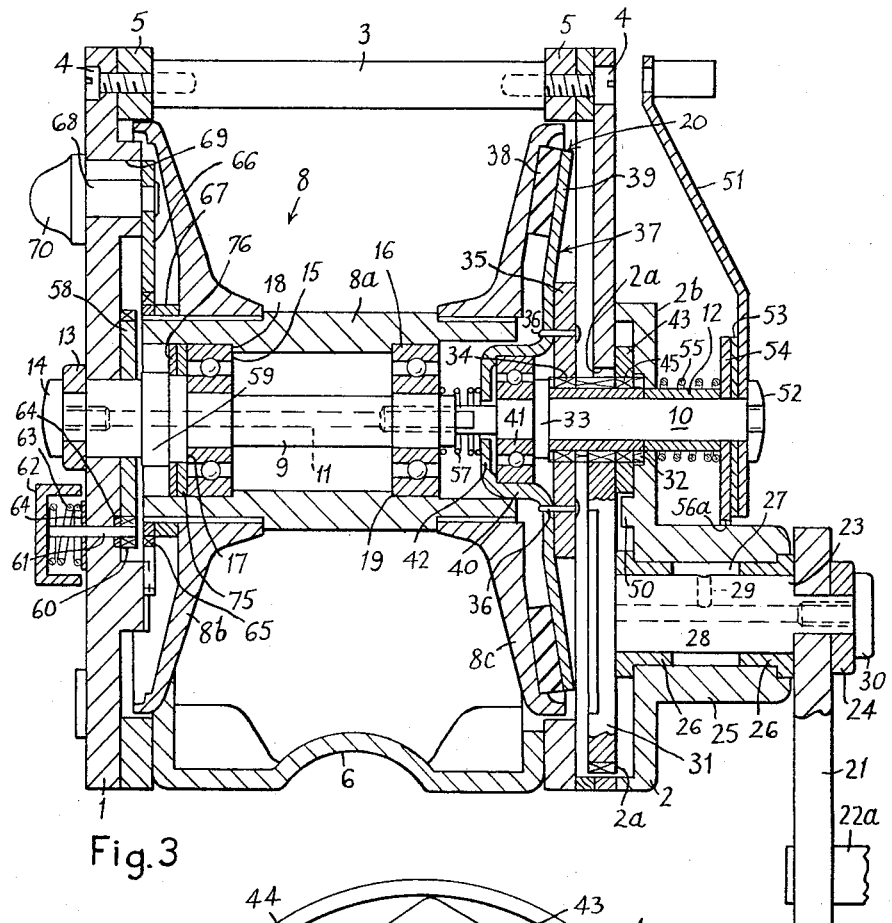
Figure 4:
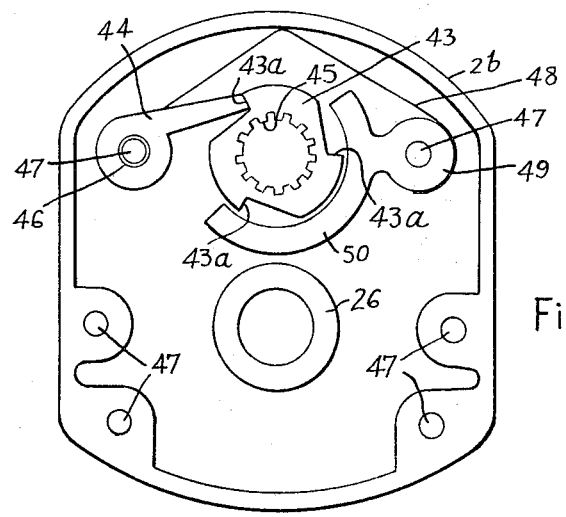

In the drawings:

FIGURE 1 is an elevational view of one side of a fishing reel according to the invention, FIGURE 2 is an elevational view of the other side, FIGURE 3 is an enlarged axial section taken on the line II—II of FIGURE 1, and FIGURE 4 is a view of the inside of the housing part covering the pawl and ratchet wheel which are shown in the operative position.

Referring to the drawings, the fishing reel comprises a frame formed by a pair of opposed side plates 1, 2 spaced apart and connected together by rod members 3 which are fixed to each side plate by screws 4 passing through the side plate and an annular spacer 5 and screwing into the adjacent ends of the rods. The spacers 5 form a peripheral wall for the space containing the drive mechanism for the spool 8 for fishing line. A reel seat 6, by which the reel may be attached to a fishing rod, is secured between the side plates by means of screws 7.

The spool 8 is rotatably mounted within the frame on a spindle assembly comprising two parts 9, 10. The spindle part 9 has its left-hand end, as seen in FIGURE 3, rotatably mounted in the side plate 1 and has an axial bore 11 extending therethrough. A nut 13 is screwed on to the left-hand end of the spindle part 9 in order to limit axial sliding movement thereof and the bore 11 is closed at this end by a screw 14. The bore is threaded at its right-hand end and into this end is screwed the threaded, left-hand end of the spindle part 10. The latter extends through an opening 2a in the side plate 2 and is rotatably mounted in a bearing 12 slidably mounted in the wall of a housing part 2b which is fixed to the outside of the plate 2 by means of screws and closes the opening 2a. The part 2b may be moulded from synthetic plastics material. The bore 11 forms a conduit through which the screw connection between the two spindle parts may be lubricated.

The spool 8 comprises a hollow cylindrical hub 8a and two annular end flanges 8b, 8c which are respectively screwed on to the opposite ends of the hub. The hub 8a is rotatably mounted on the spindle part 9 by means of ball bearings 15, 16. The inner race of the bearing 15 abuts an annular shoulder 17 on the spindle part 9 while its outer race abuts an annular shoulder 18 formed in the internal surface of the hub. The bearing 15 is adapted to withstand thrust as well as to mount the spool for rotation. The inner race of the bearing 16 is an interference fit with the spindle part 9 while its outer race abuts an annular shoulder 19 formed in the internal surface of the hub.

The spool 8 is rotatable by a winding handle through drive mechanism which incorporates a friction coupling, generally indicated at 20. The winding handle comprises an arm 21 and a knob 22 rotatably mounted on a shaft 22a projecting outwardly from adjacent one end of the arm. Adjacent its other end, the arm 21 is keyed to the outer end of a drive shaft 23 which extends through the side plate 2, and the arm is retained in keyed relation with the shaft by a nut 24 screwed on to the outer end of the shaft. The shaft 23 is rotatably mounted in a boss portion 25 of the side plate 2 by two tubular bearing members 26 located respectively at opposite ends of the boss. In order to provide for supply of lubricant to the space 27 between the bearing members 26 for lubricating these bearings, the shaft 23 has an axial bore 28 which intersects with a radial bore 29 communicating with the space 27. The open, outer end of the bore 28 is closed by a screw 30.

Fixed to the inner end of the drive shaft 23, is a gear wheel 31 which engages with a pinion 32 freely rotatable on the spindle part 10 between the bearing 12 and a flange or abutment 33 on the part 10. The pinion 32 engages with splines 34 formed around the inner periphery of an annular member 35 which is secured, for example, by rivets 36, to the member 37 of the friction coupling 20.

The friction coupling 20 is constituted by the coupling member or part 37 and a ring 38 of friction material which is fixed to the outside face of the end flange 8c of the spool. The member 37 comprises an annular plate portion 39 for contacting the annular friction coupling surface provided by the ring 38, and a hub portion 40 mounted on the outer race of a ball bearing 41, the inner race of which is mounted on the spindle part 10 and abuts the opposite side of the flange 33 to the pinion 32. The outer race of the bearing 41 abuts an inwardly projecting flange 42 at the free end of the hub portion 40, and the bearing is adapted to withstand thrust as well as to mount the member 37 for rotation. The hub portion 40 extends into the adjacent end of the hub 8a of the spool, and the internal diameter of the hub 8a at this end is made of such a size that the latter does not interfere with the movement of the hub portion 40 and vice versa. Located between the inner race of the bearing 16 and the flange 42 is a compression spring 57 which serves to urge the member 37 out of contact with the friction ring 38.

The coupling member 37 is prevented from rotating in one direction, that is clockwise as seen from the left in FIGURE 3, by a pawl and ratchet mechanism. This pawl and ratchet mechanism comprises an annular ratchet wheel 43, which is mounted on the pinion 32 adjacent the outer end of the latter and has three ratchet teeth 43a on its outer periphery, and a co-operating pawl 44 pivotally mounted on the inside surface of the housing part 2b. The pinion is connected to rotate the ratchet wheel by its teeth engaging in splines 45 formed around the inner periphery of the ratchet wheel and, in order to allow for wear of the friction coupling, the pinion is made of such a length that its outer end initially projects slightly beyond the ratchet wheel. The pivot for the pawl 44 is formed by a hollow cylindrical boss 46 (FIGURE 4) moulded on the inside surface of the housing part 2b and projecting through an aperture in the pawl. The bore through the boss 46 provides one of the holes 47 through which pass the screws for fixing the housing part to the side plate 2. The thickness of the pawl is slightly less than the axial length of the boss 46 so that when the associated fixing screw is tightened, the inner end of the boss abuts the side plate 2 and prevents the pawl from being clamped against pivoting.

The pawl 44 is resiliently urged into engagement with the ratchet teeth 43a by a leaf spring 48 which is bent intermediate its ends and which is located with the bend pressing against the inside of the peripheral wall of the housing part 2b above the ratchet wheel and with one end pressing on the top of the pawl whilst the other end is fixed in position by being hooked around the hollow boss portion 49 for another fixing screw. So that the ratchet wheel, pawl and spring can be assembled in position on the housing part 2b before the latter is fixed to the side plate 2, a semi-circular flange 50 is moulded on the inside surface of the housing part for supporting the ratchet wheel in a position for fitting on to the pinion 32.

As explained above, the spindle parts 9 and 10 are conected together by a screw thread, and the pressure with which the annular plate portion 39 presses on the ring 38 may be varied by screwing the spindle parts with respect to one another. For this purpose, the spindle part 10 has a lever 51 keyed to its end where it projects beyond the side plate 2, the lever being maintained in keyed relation with the spindle part 10 by nut 52 secrewed on to the end of the part. The lever is retained in an adjusted position by a friction washer 53 which is located on the spindle part 10 between the lever and a metal washer 54 and which is urged into contact with the lever by a compression spring 55 arranged around the bearing 12 between the side plate 2 and the washer 54. In order to prevent the washer 54 from turning with the lever 51, the washer 54 is formed with a radially projecting portion 56 having an arcuate recess 56a in its periphery which engages about the boss 25.

Also for the purpose of varying the coupling pressure of the friction coupling, the spindle part 9 has a gear wheel 58 keyed thereto between the side plate 1 and an annular shoulder or abutment 59 thereon. The gear wheel 58 engages with a pinion 60 on one end of a shaft 61 which is rotatably mounted in the side plate 1 and has a knob 62, by which the pinion may be manually rotated, on its outer end. A compression spring 63 is arranged around the shaft 61 between the knob and the side plate 1. Friction washers 64, located on the shaft 61 between the side plate 1 and the compression spring 63 and the pinion 60, prevent rotation of the pinion 60 except by manual rotation of the knob 62, and the gear wheel 58 is thus retained in an adjusted position by the pinion 60.

The fishing reel incorporates an audible clicking device comprising a ring member 65 having rounded teeth 65a around its outer periphery which are engaged by a finger member 66. The ring member 65 has a threaded inner periphery and is screwed on to the threaded, left-hand end (see FIGURE 3) of the hub 8a of the spool. It is spaced from the adjacent end flange 8b by an internally threaded sleeve 67 screwed on to the end of hub prior to the ring 65. The finger 66 is rotatably mounted from the side plate 1 by a shaft 68 passing through a radially extending slot 69 in the side plate and having an operating knob 70 on its outer end. The finger is resiliently urged into engagement with the teeth 65a by a pair of semi-circular, leaf spring portions 71 having free ends engaging respectively in recesses 72 in opposite sides of the finger. The portions 71 extend around the wheel 65 and opposite the finger they are integral with a plate portion 73 which is secured to the inner face of the side plate 1, for example, by rivets 74.

To stop the clicking device making a noise, the finger 66 is moved out of engagement with the teeth 65a by manually moving the knob 70 radially outwards. The free ends of the leaf spring portions 71 then move out of the recesses 72 and engage the inwardly tapering sides of the finger below the recesses and thereby retain the finger out of engagement with the teeth until the knob 70 is moved radially inwards.

In order to protect the bearing 15 against water and to prevent water from entering into the hub 8a through this bearing, a sealing washer 75, for example, of neoprene, is located around the shoulder 17 between the bearing 15 and a metal washer 76 abutting the shoulder 59. Water is prevented from entering at the opposite end of the hub 8a by the portion 39 of the member 37 engaging the ring 38 and by the annular member 35. Thus, all the bearings 15, 16 and 41 are protected against the ingress of water.

The fishing reel operates as follows. The annular portion 39 of the coupling member 37 and the coupling surface of the ring 38 are urged into contact with one another by the spindle parts 9, 10 through the bearings 15, 41, respectively, and when they are in contact and the winding handle is turned in a clockwise direction, as seen in FIGURE 1, the spool 8 rotates in an anti-clockwise direction. This enables fishing line to be wound on to the spool. The winding handle cannot be rotated in an anti-clockwise direction since the pawl 44 then engages in the ratchet teeth 43a to prevent rotation of the coupling member 37, and thus the spool cannot be rotated in a clockwise direction by the handle. However, the spool can rotate by itself in the clockwise direction, and the pressure with which the annular plate portion 39 presses on the ring 38 determines the braking force applied to the spool through the friction coupling when it rotates in this direction. This braking force applies a drag on the fishing line when it is being pulled off the spool by a fish and the degree of drag is variable by adjusting the lever 51 and/or the knob 62 to screw the spindle parts 9, 10 with respect to one another. The knob 62 is used to alter the range over which the coupling pressure can be varied quickly by the lever 51. In order to allow for casting of the fishing line, the spindle parts can be unscrewed, by adjustment of the lever 51 and knob 62, to a position where the annular portion 39 is out of contact with the friction ring 38 so that the spool 8 can free-wheel.

It is to be understood that the embodiment hereinbefore described is only given by way of example and that modifications can be made thereto without departing from the scope of the invention as defined by the appended claims. For example, the spindle part 9 may be screwed into an axial bore in the adjacent end of the spindle part 10 instead of vice versa. Furthermore the pinion 32 may be connected to the ratchet wheel 43 by having a squared or other flat-sided end portion fitting into a correspondingly shaped aperture in the centre of the ratchet wheel.

I claim:

1. A fishing reel comprising a frame including a pair of spaced side members, a spindle assembly supported by said side members and comprising two parts, screw thread means connecting said two parts together in axial alignment and for relative axial adjustment, means normally restraining said two parts against turning relative to said side members, abutments disposed respectively on said two parts in a position between said side members, a spool for fishing line mounted on the spindle assembly between said side members for rotation relative to said spindle assembly, a friction surface rotatable with said spool, a friction member mounted on said spindle assembly between said side members for rotation relative to said spindle assembly and opposing said friction surface, said friction member and friction surface constituting a friction coupling, and said spool and friction member being held by the abutments from moving axial apart from the position to which the abutments are adjusted by the screw thread means, manually operable means for turning at least one of said parts of the spindle assembly relative to the other part to effect axial adjustment of said abutments, a winding handle secured to the outer end of a drive shaft which passes through and is rotatably mounted in the side member adjacent the friction member, said drive shaft being located parallel to and in spaced relation with the spindle assembly, a gear wheel secured to the inner end of said drive shaft, a pinion freely rotatable on the spindle assembly and engaging said gear wheel, said pinion having an axially inner configuration engaging splines formed around the inner periphery of an annular member secured to the friction member, and one-way brake means preventing the friction member from rotating in one direction relative to said frame.

2. A fishing reel as claimed in claim 1, wherein said one-way brake comprises a pawl mounted on the side member adjacent said friction member, a set of ratchet teeth associated with said friction member, and means resiliently urging said pawl into engagement with said ratchet teeth.

3. A fishing reel comprising a frame including a pair of spaced side members, a spindle assembly comprising two parts, said two parts being mounted respectively in said side members, screw thread means coupling said two parts together in axial alignment and for relative axial adjustment, means normally yieldingly restraining said two parts against turning relative to said side members, abutments disposed respectively on said two parts in a position between said side members, a spool for fishing line, bearings rotatably mounting said spool on said spindle assembly between said side members, at least one of said bearings including inner and outer race members and being adapted to withstand thrust, a friction surface rotatable with said spool, a friction member opposing said friction surface and constituting therewith a friction coupling, a further bearing rotatably mounting said friction member on said spindle assembly between said side members, said further bearing including inner and outer race members and being adapted to withstand thrust, and both said thrust bearings being disposed between said abutments with their inner race members respectively abutting said abutments, a manually operable member secured to one part of said spindle assembly for turning said one part relative to the other part, a winding handle carried by the side member adjacent said friction member, gear means operatively connecting said winding handle to said friction member, and a pawl and ratchet mechanism preventing said friction member from rotating in one direction relative to said side members.

4. A fishing reel as claimed in claim 3, wherein said manually operable member is movable between limits and manual means are operatively connected to said other part of the spindle assembly for rotating said other part relative to said one part.

5. A fishing reel comprising a frame including a pair of spaced side plates, a spindle assembly comprising two parts arranged in end-to-end relation, complementary screw-threaded portions on the adjacent ends of said two parts connecting said parts together in axial alignment, said two parts being rotatably mounted respectively in said side plates, annular abutments disposed respectively on said two parts in a position between said side plates, said two abutments having mutually facing abutment surfaces, a spool for fishing line including a hub provided with annular flanges at opposite axial ends thereof respectively, rolling bearings rotatably mounting said hub between said side plates on one of said parts of the spindle assembly, said bearings each including inner and outer race members and one of said bearings being adapted to withstand thrust and having its inner race member abutting said abutment surface on said one part, an annular friction member opposing the outer face of the spool flange adjacent the other part of the spindle assembly, a further rolling bearing rotatably mounting said friction member on said other part of the spindle assembly, said further bearing including an inner and outer race member and being adapted to withstand thrust, and said inner race member abutting said abutment surface on said other part, a ring of friction material disposed between said friction member and said adjacent spool flange, a manually operable lever secured to the end of said other part remote from said one part, a gear wheel secured to said one part between the spool and the adjacent side plate, a manually rotatable shaft rotatably mounted in said adjacent side plate, a pinion secured to said shaft and engaging said gear wheel, friction means normally preventing said shaft from rotating, a winding handle carried by the side plate adjacent said friction member, gear means operatively connecting said winding handle to said friction member, and a pawl and ratchet mechanism arranged between the friction member and the adjacent side plate for preventing said friction member from rotating in one direction relative to the frame.

6. A fishing reel comprising a frame including a pair of side members, a spindle assembly comprising two parts, said two parts being mounted respectively in said side members, screw thread means connecting said two parts together in axial alignment and for relative axial adjustment, means normally yieldingly restraining said parts against turning relative to said side members, abutments disposed respectively on said two parts in a position between said side members, said two abutments having mutually facing abutment surfaces, a spool for fishing line including a hub, rolling bearings rotatably mounting said hub on one of said spindle parts, one of said bearings including inner and outer race members and being adapted to withstand thrust, and said inner race member abutting the abutment surface on said one part, a friction surface rotatable with said spool, a friction member opposing said friction surface, a further rolling bearing which includes inner and outer race members and is adapted to withstand thrust rotatably mounting said friction member on the other spindle part, said inner race member of said further bearing abutting the abutment surface on said other part, manual means for turning said two parts relative to one another, a winding handle carried by the frame, gear means operatively connecting said winding handle to said friction member, and a pawl and ratchet mechanism preventing said friction member from rotating in one direction relative to said side members.

7. A fishing reel as claimed in claim 6, including sealing means disposed on said one spindle part inside the hub of said spool and in a position between the side member mounting said one spindle part and the adjacent rolling bearing mounting said hub, said sealing means being in operative contact with the spindle assembly and said hub.

8. A fishing reel as claimed in claim 1, wherein said one-way brake comprises a ratchet wheel, which has ratchet teeth on its outer periphery, mounted on said pinion, a pivoted pawl carried by the side member adjacent said friction member, and means resiliently urging said pawl into engagement with said ratchet teeth.

9. A fishing reel comprising a frame including a pair of side members, a spindle assembly comprising two parts, said two parts being supported respectively by said side members, screw thread means coupling said two parts together in axial alignment and for relative axial adjustment, means normally restraining said two parts against turning relative to said side members, a spool for fishing line mounted on the spindle assembly between said side members for rotation relative to said spindle assembly, a friction surface rotatable with said spool, a friction member mounted on said spindle assembly between said side members for rotation relative to said spindle assembly and opposing said friction surface, said friction member and friction surface constituting a friction coupling, abutments disposed respectively on said two spindle parts in a position between said side members and holding said spool and friction member from axial moving apart relative to one another, whereby relative axial adjustment of said two spindle parts effects variation of the friction coupling pressure between said friction member and friction surface, manual means for turning at least one of said parts of the spindle assembly relative to the other part to effect said axial adjustment, a winding handle carried by said frame, gear means operatively connecting said winding handle to said friction member, said gear means including a pinion directly coupled to said friction member, and a pawl and ratchet mechanism for preventing the friction member from rotating in one direction relative to said frame, said mechanism including a ratchet wheel, which has ratchet teeth on its outer periphery, mounted on and rotating with said pinion and a co-operating pawl pivotally mounted on the reel frame and resiliently urged into engagement with said ratchet teeth, said pinion being connected to rotate the ratchet wheel by its pinion teeth engaging in splines formed around the inner periphery of said ratchet wheel.

10. A fishing reel as claimed in claim 9, wherein the pinion is freely rotatable on the spindle assembly and engages in splines formed around the inner periphery of an annular part rotating with the friction member.

11. A fishing reel as claimed in claim 10, wherein the winding handle is secured to the outer end of a drive shaft which passes through and is rotatably mounted in the side member adjacent the friction member, said drive shaft being located substantially parallel to and in spaced relation with the spindle assembly, and said gear means including a gear wheel secured to the inner end of said drive shaft and engaging with the pinion.

References Cited by the Examiner
UNITED STATES PATENTS

| | | | |
|---|---|---|---|
| 1,547,238 | 7/1925 | Russell et al. | 242—84.44 |
| 2,022,042 | 11/1935 | Knowles | 242—84.44 |
| 2,150,088 | 3/1939 | White | 242—84.44 |
| 2,278,022 | 3/1942 | Rodgers | 254—187 |
| 2,298,481 | 10/1942 | Hayes | 242—84.45 |
| 2,364,047 | 12/1944 | Bardon | 242—84.46 |
| 2,462,365 | 2/1949 | Crawford | 242—84.45 X |
| 2,531,610 | 11/1950 | Butzman | 242—84.46 X |
| 2,633,308 | 3/1953 | Zientowski | 242—84.51 |
| 3,017,135 | 1/1962 | Wood | 242—84.54 |
| 3,146,966 | 9/1964 | Dunn | 242—84.45 |

FRANK J. COHEN, *Primary Examiner.*

MERVIN STEIN, STANLEY N. GILREATH,
*Examiners.*

B. S. TAYLOR, *Assistant Examiner.*